United States Patent
Anthony et al.

(10) Patent No.: US 9,740,155 B2
(45) Date of Patent: Aug. 22, 2017

(54) PRINT GLOSSING

(71) Applicant: Hewlett-Packard Development Company, L.P., Fort Collins, CO (US)

(72) Inventors: Tom Anthony, Palo Alto, CA (US); Napoleon J Leoni, Palo Alto, CA (US); Henryk Birecki, Palo Alto, CA (US); Matthew G Lopez, San Diego, CA (US); Omer Gila, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/112,937

(22) PCT Filed: Jan. 23, 2014

(86) PCT No.: PCT/US2014/012644
§ 371 (c)(1),
(2) Date: Jul. 20, 2016

(87) PCT Pub. No.: WO2015/112141
PCT Pub. Date: Jul. 30, 2015

(65) Prior Publication Data
US 2016/0342127 A1 Nov. 24, 2016

(51) Int. Cl.
*G03G 15/00* (2006.01)
*B41F 23/00* (2006.01)
(Continued)

(52) U.S. Cl.
CPC ......... *G03G 15/6585* (2013.01); *B41F 23/08* (2013.01); *C09D 11/00* (2013.01);
(Continued)

(58) Field of Classification Search
CPC ..... G03G 15/6585; G03G 2215/00426; G03G 2215/00666; G03G 2215/00805;
(Continued)

(56) References Cited

U.S. PATENT DOCUMENTS 2,526,318 A * 10/1950 Battin .................. B29C 59/04
101/212
3,982,056 A * 9/1976 Holder, Jr. ............ B41M 1/36
427/361
(Continued)

FOREIGN PATENT DOCUMENTS

EP 0343794 A2 4/1989
JP 63209993 A * 8/1988
(Continued)

OTHER PUBLICATIONS

Production of a Single Coated Glossy Inkjet Paper Using Conventional Coating and Calendering Methods Hyur Kook Lee, Margarel K. Joyce, Paul D. Flemirg, ard John H. Camero.

*Primary Examiner* — Robert Beatty
(74) *Attorney, Agent, or Firm* — HP Inc. Patent Department

(57) ABSTRACT

Print glossing is described. Print glossing can be performed on a glossing drum having a location affixed to a circumferential outer surface thereof, where the location transits from a first position in an apparatus having a first temperature range selected to enable reflow of ink applied to a substrate that is placed at the location to a second position in the apparatus having a second temperature range selected for clean release from the location of the ink applied to the substrate.

17 Claims, 2 Drawing Sheets

(51) Int. Cl.
 *B41M 7/00* (2006.01)
 *B41F 23/08* (2006.01)
 *C09D 11/00* (2014.01)
(52) U.S. Cl.
 CPC ..... *B41M 7/00* (2013.01); *G03G 2215/00426* (2013.01); *G03G 2215/00805* (2013.01)
(58) Field of Classification Search
 CPC .. B41F 23/08; B41M 7/00; B41M 7/09; B41J 11/002; D06C 15/00; D06C 15/02
 USPC ......................................................... 399/341
 See application file for complete search history.

(56) References Cited

U.S. PATENT DOCUMENTS

| | | | |
|---|---|---|---|
| 4,807,560 A * | 2/1989 | Stone | G03F 7/002 118/101 |
| 5,887,235 A * | 3/1999 | Wayman | G03G 15/2039 399/329 |
| 6,623,902 B1 | 9/2003 | Ben-Avraham et al. | |
| 6,637,338 B2 | 10/2003 | Veil | |
| 7,040,230 B2 | 5/2006 | Hecht | |
| 7,241,355 B1 * | 7/2007 | Landa | B32B 37/0015 156/164 |
| 7,502,582 B2 * | 3/2009 | Ng | G03G 15/2064 399/296 |
| 7,856,926 B2 | 12/2010 | Thal | |
| 8,440,379 B2 | 5/2013 | Roditi et al. | |
| 8,512,930 B2 | 8/2013 | Chatow et al. | |
| 2007/0280758 A1 | 12/2007 | Ciaschi et al. | |
| 2010/0112232 A1 | 5/2010 | Chretien et al. | |
| 2012/0076558 A1 | 3/2012 | Schulze-Hagenest | |
| 2012/0328343 A1 * | 12/2012 | Kunii | G03G 15/0189 399/341 |
| 2012/0328345 A1 | 12/2012 | Kunii et al. | |
| 2013/0149017 A1 * | 6/2013 | Amita | G03G 15/2078 399/341 |

FOREIGN PATENT DOCUMENTS

| | | | |
|---|---|---|---|
| JP | 2001239764 A * | 9/2001 | |
| WO | WO-01-12342 A1 | 2/2001 | |

* cited by examiner

230

```
┌─────────────────────────────────────────────┐
│   PLACING A SURFACE OF A TONER-BASED IMAGE  │
│   DIRECTLY IN CONTACT WITH A LOCATION ON A  │
│   CIRUMFERENTIAL OUTER SURFACE AFFIXED TO A │── 232
│   ROTATING GLOSSING DRUM, WHEREIN A FIRST   │
│   TEMPERATURE OF THE LOCATION IS AT LEAST A │
│   GLASS TRANSITION TEMPERATURE OF A TONER IN THE │
│              TONER-BASED IMAGE              │
└─────────────────────────────────────────────┘
                      │
┌─────────────────────────────────────────────┐
│   MAINTAINING THE TONER-BASED IMAGE IN DIRECT │
│   CONTACT WITH THE LOCATION AFFIXED TO THE  │
│   CIRCUMFERENTIAL OUTER SURFACE OF THE      │── 234
│   ROTATING GLOSSING DRUM UNTIL A SECOND     │
│   TEMPERATURE OF THE LOCATION IS BELOW THE  │
│   GLASS TRANSITION TEMPERATURE OF THE TONER │
└─────────────────────────────────────────────┘
```

Fig. 2

PRINT GLOSSING

BACKGROUND

Glossing text or an image printed on a substrate may improve quality thereof as perceived by a viewer. For instance, colors in an image may appear to be brighter after glossing and, thus, an overall impression conveyed by the image may be more appealing.

Hence, glossing of text or images is desirable in association with a printing process. Glossing may be performed by coating, for instance, with lacquer or varnish, or by lamination, for instance, with a film. However, these processes may be complicated and/or expensive.

BRIEF DESCRIPTION OF THE DRAWINGS

FIG. 2 is a flow diagram of an example method for print glossing according to the present disclosure.

DETAILED DESCRIPTION

Figure 1:
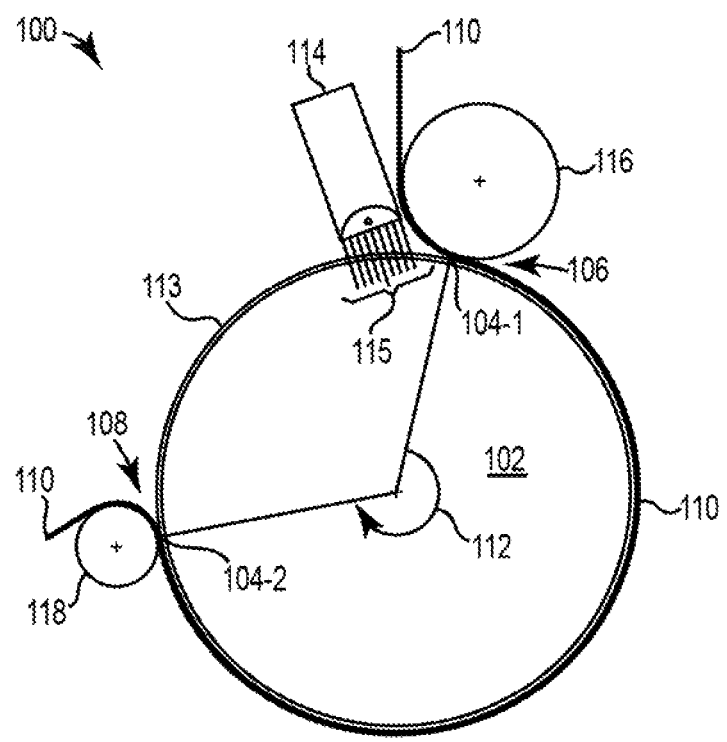
FIG. 1 illustrates an example of a print glossing apparatus according to the present disclosure.

Printer technology is expected to print high quality images (e.g., text, pictorial representations, diagrams, etc.) for a variety of markets. Some markets (e.g., the photograph market) may prefer images to have a high gloss such that the images appear "shiny" relative to those with less gloss. Many printers themselves may be incapable of producing images having high gloss so that producing the high gloss may involve possibly complex and/or expensive post-processing. Such post-processing may involve a number of devices, possibly outside the printer, by which glossing, may be performed, for instance, by coating the image (e.g., with lacquer or varnish) or by lamination of the image (e.g., with a transparent film material), which may involve a sequence of several actions.

In contrast, the present disclosure describes reflowing a printed toner, which is part of ink used to previously print the image, against a smooth surface, which can, for example, be performed in a "glossing station" in the same apparatus in which the image was originally printed. As described in a number of examples of the present disclosure, print glossing can be performed on a glossing drum having a location affixed to a circumferential outer surface thereof, wherein the location transits from a first position in the apparatus (e.g., the glossing station) having a first temperature range selected to enable reflow of ink (e.g., ink containing the toner) applied to a substrate that is placed at the location to a second position in the apparatus (e.g., a release station) having a second temperature range selected for clean release from the location of the ink applied to the substrate.

As used herein, "ink" is a generic term that includes various substances applied by a printer to form an image on a substrate. For example, ink may include various colorants and/or pigments ranging from black through the colors of the spectrum to white, in addition to being transparent in the human visual range. Such colorants and/or pigments may be mixed with (e.g., suspended, dissolved, etc.) a solid carrier material (e.g., a toner) for application to the substrate. In various examples, a toner may be a composition of particles applied to the substrate as a dry powder, as in the case of a laser printer. Alternatively, the toner particles may be suspended in a liquid transport medium, as in the case of a liquid electrophotography (LEP) printer or an ink jet printer.

Toners may include various polymers to, for example, assist in bonding of the colorants and/or pigments to the substrate. Examples of such polymers include styrene acrylate copolymers, polyester resins, styrene butadiene copolymers, maleic anhydride terpolymers, maleic anhydride grafted linear low density polyethylenes, maleic anhydride grafted polypropylene copolymers, maleic anhydride grafted linear ethylene acetate polymers, maleic anhydride grafted linear ethylene acetate polymers, among other materials with anhydride functionality, ethylene methacrylic acid copolymers and their ionomers, ethylene acrylic acid copolymers and their ionomers, polyamides, esters of ethylene methacrylic acid copolymers, low molecular weight ethylene acrylic acid copolymers, ionomers of low molecular weight ethylene acrylic acid copolymers, esters of ethylene acrylic acid copolymers, and acid modified ethylene vinyl acetate terpolymers, etc., among many other possibilities and/or mixtures thereof. Other usable polymers include polymers having an epoxy functionality that appears to bonds with hydroxyl functionalities in the substrate. Compositions, granule size, and/or melting points (e.g., flow and reflow temperatures) vary among different toners.

Accordingly, as used herein, the ink can include the toner, whereby the ink can be used to form the image on the substrate. The image can include graphics (e.g., text, pictorial representations, diagrams, etc.) and, in some examples, an overcoat (e.g., a substantially transparent material) applied over the graphics during a printing process prior to glossing. As such, toner can be present in any part of the image (e.g., material used to form the graphics and/or material used to form the overcoat). Hence, print glossing, as described herein, can be performed within or in combination with various types of ink jet, laser, and/or LEP printers, among others.

FIG. 1 illustrates an example of a print glossing apparatus according to the present disclosure. The print glossing apparatus 100 illustrated in FIG. 1 shows a glossing drum 102. The glossing drum 102 can be formed from various materials (e.g., metals, alloys, plastics, and/or ceramics, etc.) and with various diameters that are selected based on, for example, heat transfer characteristics, as described further herein. The glossing drum 102 can have a location 104-1 affixed to the circumferential outer surface thereof, such as a location on the outer surface of the glossing drum 102 or on the outer surface of a release material 113 and/or a thermal barrier material 113 affixed to the outer surface of the glossing drum 102, as described further herein.

During rotation 112 of the glossing drum 102, the location 104-1 can transit from a first position 106 (e.g., a glossing station). The same location 104-2 can transit during the rotation 112 to a second position 108 (e.g., a release station). In various examples, an image (not shown) previously printed on a substrate 110 (e.g., on various forms of print media functioning as a web or carried by a web) also can be transited during the rotation 112 at the location 104-1, 104-2 from the first position 106 (e.g., the glossing station) to the second position 108 (e.g., the release station).

The print glossing apparatus 100 can include a heating element 114 that locally raises a temperature of a portion 115 of at least the outer surface of the glossing drum 102. The heating element 114 also can raise the temperature below the outer surface to varying levels relative to the outer surface (e.g., depending on the materials from which the glossing drum 102 is formed, the thickness thereof, the release material 113 and/or the thermal barrier material 113 affixed to the outer surface thereof, etc.). The heating element 114 can, in various examples, be one or more of a radiant heater, a conduction heater, and/or a convection heater, among other types of heaters. Examples of radiant heaters can include one or more ultraviolet (UV), visible, and/or infrared (IR) light sources (e.g., lamps). For example, an IR light source that raises the temperature of at least the outer surface of the glossing drum 102 effectively to a range selected to enable reflow of ink toner can have an IR power density of at least 200 Watts per square centimeter (cm).

During rotation 112 of the glossing drum 102, the locally heated portion 115 transits to include the location 104-1 at the first position 106 (e.g., the glossing station), which also includes the image (not shown) previously printed on the substrate 110. The locally heated portion 115 transits to the first position 106 within a short time window, as described further herein, such that loss of temperature of the locally heated portion 115 prior to rotation to the first position 106 is reduced. The temperature of the locally heated portion 115 thus can remain at least at a glass transition temperature of, for example, the ink toner to enable reflow thereof based on the ink of the image directly contacting the locally heated portion 115 at the location 104-1 at the first position 106 (e.g., the glossing station).

The print glossing apparatus 100 can include a compression roller 116 associated with the first position 106 (e.g., the glossing station). The compression roller 118 can compress the ink of the image directly contacting the locally heated portion 115 at the location 104-1 to cause reflow of the toner of the ink, heated to at least the glass transition temperature thereof (e.g., by pressing on the back of the substrate 110 upon which the image has previously been printed). The speed of the rotation of the glossing drum 102 and/or the compression roller 116 affects a length of time during which the image (e.g., the toner in the ink forming the image) is in contact with the locally heated portion 115 while being pressed by the compression roller 116. Variations in this length of time can affect a level of gloss increase imparted to the image relative to a baseline gloss level, which can be further affected by how high the temperature of the ink toner is raised, as described further herein.

As the rotation 112 of the glossing drum 102 causes the location 104-1 at the first position 106 to progress toward the location 104-2 at the second position 108, the temperature of the location 104-1 can fall to below the glass transition temperature of the ink (e.g., the toner thereof) of the image. The temperature of the location 104-1 falling below the glass transition temperature of the ink can contribute to the ink losing plasticity. The substrate 110 and the image printed thereon can be removed from contact with the location 104-2 on the outer surface of the glossing drum 102 at the second position 108 (e.g., the release station) by a release roller 118 over which the substrate is rolled.

Loss of plasticity (e.g., increase in viscosity) of the ink resulting from the ink falling below the glass transition temperature, combined with an increased angle of release resulting from a diameter of the release roller 118 being notably smaller than the diameter of the glossing drum 102, can contribute to clean release of the image from contact with the glossing drum 102. Contributions to the temperature falling sufficiently between the first position 106 and the second position 108 can be provided by the glossing drum 102 being affixed to (e.g., coated with) a thermal barrier material having a sufficiently low thermal conductivity, as described further herein, and/or actively controlling the temperature of at least a portion of the glossing drum 102 to be below the glass transition temperature, as described further herein. Contribution to the clean release of the image from contact with the location 104-2 on the glossing drum 102 can be provided by the glossing drum 102 being affixed to (e.g., coated with) a release material 113 that facilitates clean release of the image with a reduced tendency to retain content of the image (e.g., pigments, toner, and/or an overcoat that form the image), as described further herein.

By way of example and not by way of limitation, an LEP graphic print can be overprinted with an overcoat (e.g., including a transparent toner layer) as an additional impression in the LEP printing process and then the overcoat (e.g., the toner thereof) can be reflowed by passing the image through the first position 106 (e.g., the glossing station). As described herein, the location 104 on the glossing drum 102 goes through a temperature excursion from, for example, above to below the glass transition temperature of the toner of the overcoat during each rotation 112 (e.g., a time for one rotation, that is one rotation period) of the glossing drum 102. This enables the toner to be reflowed on and released from the same surface under cyclical changes in thermal conditions.

In various examples, a printed image with a transparent LEP overcoat (e.g., having a 0.5 to 5.0 micrometer thickness) can be glossed on an apparatus 100 with a heated glossing drum 102 affixed to (e.g., coated with) a release material 113, as described further herein, where the release material can be interposed between the printed image and the glossing drum. In various examples, to facilitate the temperature excursion, the glossing drum 102 can be affixed to (e.g., coated with) a thermal barrier material 113. A print glossing apparatus 100 consistent with the present disclosure can include either one of, both of, or neither of the release material and/or the thermal barrier material. The relate scale of the release material and/or the thermal barrier material shown in FIG. 1 with regard to the glossing drum 102, etc., is intended to illustrate an example of the positioning of affixation (e.g., coating with) these materials and should not be taken in a limiting sense. In some examples, as described further herein, the thermal barrier material also can serve as the release material and/or a smoothing surface on the glossing drum 102. In various examples, a core temperature of the glossing drum can be maintained below the glass transition temperature of the toner. In various examples, the heating element 114 (e.g., a number of IR lamps) can heat the thermal barrier material 113 above the glass transition temperature of the toner of the image on the substrate 110 prior to the image reaching the first position 106 (e.g., the glossing station).

In those images having a toner-based overcoat, as opposed to the toner being combined with the pigment to form the image, an overcoat thickness of approximately 1.0 micrometer is suitable. Toners suitable for practicing embodiments of the present disclosure are liquid toners such as Electroink® manufactured by Indigo N. V. However, the present disclosure is not limited to these toners. That is, the present disclosure is generally applicable, at least in part, to any printing process that prints a thin (compared to the roughness of normal papers) toner-based image. Overall, printed portions of the image can have a thickness of approximately 10 micrometers or less.

Several elements can contribute to the efficacy and/or cost-effectiveness of forming a high gloss, durable LEP print. The LEP image can be printed on offset paper that does not include a special polymer-coated substrate (e.g., as used for silver halide technology). A durable, transparent overcoat with toner (e.g., a version of Hewlett Packard® (HP®) Electroink® ink) can be applied to an image by a single additional LEP print pass.

Liquid toners suitable for electrostatic imaging (e.g., LEP imaging) include the class of toners referred to herein as Electroink®. This toner is characterized by having toner particles dispersed in a liquid transport medium, where the toner particles can comprise a mixture of two or more polymers to provide suitable adhesive bonding to a substrate and rheological properties suitable for ink transfer in a printer (e.g., an LEP digital press). When the toner particles are dispersed in the liquid transport medium in a low concentration, the particles remain separate. When the toner develops an electrostatic image, the concentration of toner particles increases and a solid image is formed.

As described herein, liquid toners can include pigmented toner particles in the liquid transport medium. The pigment described herein can be colorants ranging from black through the colors of the spectrum to white (e.g., for use in forming a visually perceptible portion of an image) in addition to being transparent in the human visual range (e.g., for use in forming a visually transparent overcoat of an image).

In some examples, the polymers can include a first, relatively higher viscosity material and a second, relatively lower viscosity material. In some examples, a third polymer, also having a relatively low viscosity, can be included. At least one of the polymers can be reactive with components of a substrate on which the toner is printed.

In some examples, the first polymer can have an anhydride functionality and can be compatible (e.g., forms a homogeneous mixture) with the other toner polymers in the particles. The oxygen in the anhydride functionality is believed to form a bond (e.g., at a fixing temperature of approximately 70 to 90 degrees Celsius (° C.)) with hydrogen in the substrate (e.g., in the cellulose of offset paper). Thus, under high speed printing conditions, the anhydride (or other material with a high affinity for print substrate) can provide for adequate bonding of the toner to the substrate, despite relatively short times available for transfer of the toner to the substrate and for fusing it thereto.

The first polymer may be in the form of a terpolymer containing an anhydride functionality (e.g., such as maleic anhydride terpolymer) or it may, for example, be maleic anhydride grafted linear low density polyethylene, maleic anhydride grafted polypropylene copolymer, and/or maleic anhydride grafted linear ethylene acetate polymer, maleic anhydride grafted polypropylene copolymer, and maleic anhydride grafted linear ethylene acetate polymer, among other materials with anhydride functionality. Other usable polymers include polymers having an epoxy functionality that appears to bonds with hydroxyl functionalities in the substrate.

The second polymer may include any polymer or mixture of polymers having suitable viscosity, solvation, and other parameters for the toner. Some suitable second polymer materials include ethylene methacrylic acid copolymers and their ionomers, ethylene acrylic acid copolymers and their ionomers, polyamides, an ester of ethylene methacrylic acid copolymer, low molecular weight ethylene acrylic acid copolymer, an ionomer of low molecular weight ethylene acrylic acid copolymer, an ester of ethylene acrylic acid copolymer, and an acid modified ethylene vinyl acetate terpolymer, etc., and/or mixtures thereof, it should be understood that some of these materials may have relatively higher or low viscosities and that various polymers may be blended to provide a desired viscosity.

As such, in various examples, a liquid toner can include a liquid transport medium and toner particles dispersed in the liquid transport medium. The toner particles can, in various examples, be a polymer blend that includes a first polymer having a relatively higher chemical reactivity with a substrate and a second polymer having a relatively lower or null chemical reactivity with the substrate. The polymer blend can have, on a semi-logarithmic viscosity versus temperature cooling curve, a glass transition temperature (e.g., in a range of from 60-100° C.), where at temperatures below the glass transition temperature, the rate of change of viscosity with temperature is higher than the rate of change at temperatures above the glass transition temperature. For example, at the transition temperature the viscosity can be below approximately $10^7$ centipoise and above approximately $10^4$ centipoise. In various examples, the polymer blend can be substantially insoluble in the liquid transport medium and at least one of the polymers solvates the liquid transport medium at an elevated temperature (e.g., above the glass transition temperature).

For example, the overcoat, as described herein, can be reflowed at an elevated temperature (e.g., at from 70 to 150° C.) against a smooth surface while being compressed (e.g., by a compression roller 116 applying a force, as described herein) to form a smooth, high gloss printed image. The printed image can be released from a release material 113 on the surface of the glossing drum at a controlled temperature less than the reflow temperature (e.g., at from 30 to 90° C.). The reflow and the release can occur on the same glossing drum such that the glossing can be implemented in a compact, single drum system. As determined by direct comparison, gloss and optical quality similar to photographs produced by a silver halide process can be achieved on standard offset media by print glossing as described herein. Such print glossing can provide a notable cost advantage over existing silver halide technology.

Trials can be conducted by printing images in an LEP digital press (e.g., using an HP® Indigo™ model HP7500, among others) and applying a layer of overcoat to the prints. The prints can be either solid black (100% K) or color photographs and the prints can be overcoated with either one or two impressions (0.7 or 1.4 micrometers total) of the overcoat material. A variety of media can be used as substrate to evaluate the glossing process, including: HP® Premium Photo Gloss™ (two side polyethylene-coated high gloss); HP® Luster™ (two side polyethylene-coated luster finish); New Page® Sterling® Ultra Digital™ Gloss Cover 80#; New Page® Sterling® Ultra Digital™ Gloss Text 100#; Hankuk Paper Manufacturing Company Jefferson Spirit™ Silk 100#: and Xpedx® Endurance Digital™ Silk 100#; among others.

Enabling a reflowed toner (e.g., polymers thereof) to cleanly release from a surface can be a challenge relative to getting the toner to reflow while in contact with a heated surface. As such, overcoated prints can be glossed by passing the prints through high temperature while being rolled under compression and while the inked side of the print is in contact with a release material 113, as described further herein. As the overcoated print is fed through the high temperature under compression (e.g., in the glossing station), the temperature of the toner in the ink exceeds its glass transition temperature to allow the ink to fellow and the time spent in the glossing station is sufficient for the ink to physically redistribute.

For example, print samples of 100% K with 1.4 micrometers of overcoat material on 4 different substrates can be glossed as described above using 25 micrometers of Upilex® S (a polyamide sheet manufactured by DuPont™) as the release material 113 and a glossing station at 147° C. In this example, the release material 113 can be introduced into the glossing station 106 (e.g., in a nip of the glossing station), as described herein, between the glossing drum 102 and the substrate 110 as a separate sheet of material on the printed side of the substrate. Results show that a gloss level measured at a 75 degree angle (90 degrees being vertical from a surface being measured) is correlated with a feed rate through the glossing station. That is, the Jefferson Spirit™ Silk, Endurance Digital™, and New Page® Sterling® offset media show similar behavior by having uniformly high gloss up to a feed rate of approximately 2.5 centimeters per second (cm/s) followed by a notable reduction in gloss as the feed rate increases. HP® Premium Photo Gloss™ paper, which has a polyethylene (PE) coating, exhibits a more moderate dependence on the feed rate, because the PE coating reflows during the glossing process and facilitates smoothing of the ink. Similar levels of glossing are measured on the offset media with 0.7 micrometers of overcoat material as are measured with 1.4 micrometers.

Measurements of temperature as a function of feed rate reveal that the drop in gloss with feed rate is related to the temperature of the surface of the printed image at an interface between the printed image and the glossing drum, the release material, and/or the thermal barrier material. For example, although the surface temperature of the glossing drum is 147° C. before entry into the glossing station, a measured temperature of the release material, and/or the thermal barrier material in contact with the surface of the surface of the printed image under compression at a feed rate of 2.3 cm/s in the glossing station is approximately 120° C. As the feed rate increases, the temperature decreases further. Comparative contributions of feed rate versus temperature on glossing efficacy can be evaluated while a sample is in contact with a thermal mass that has been heated to a controlled temperature on a hotplate. Results show that a glossing level is strongly influenced by temperature and that the glossing level has a lesser, but still significant, dependence on the feed rate. The results show that high gloss (e.g., >95) can be achieved on offset paper after exceeding a threshold glossing temperature of the ink, which can be influenced by the feed rate. For example, the ink temperature can be above 105° C. to get high gloss for a feed rate of 9.1 cm/s.

The feed rate dependence appears to be due to the time for the ink to redistribute (e.g., reflow) and to replicate the smooth surface of the release material. The redistribution occurs in the glossing station (e.g., in the nip of the glossing station), as described herein, which under the test conditions can be 5 millimeters (mm) wide in the direction of rotation of the glossing drum. At a feed rate of 9.1 cm/s, residence time in the glossing station is 55 milliseconds (msec). Commercial printers may have print speeds higher than 9.1 cm/s, which would translate to a temperature higher than 105° C. and/or a larger width of the glossing station.

As described herein, the ink (e.g., the toner, the overcoat material, pigment, colorant, etc.) of the printed image can be compressed by a force applied by a compression roller 116. Compression rollers having a variety of parameters (e.g., length, diameter, and/or construction) are suitable for implementation as described in the present disclosure. By way of example, a compression roller can have a relatively hard core (e.g., a hollow aluminum tube that can, for example, have a diameter of 20 to 50 mm) with at least a portion of an external surface thereof that will apply force to the printed image covered by a relatively compressible material (e.g., rubber, or other such compressible and/or compliant materials, with a thickness of, for example, 5 to 20 mm). In various examples, the compression roller can have a length perpendicular to the direction of the rotation of the compression roller that can, for example, be determined by a width of a print substrate and/or images printed thereon, among other considerations.

A size (e.g., an area measured, for example, in square meters) of the nip in the glossing station (e.g., a length and width of the compression roller that compresses the image) can be affected by a number of determinants. Such determinants can, for example, include the compressibility, compliancy, and/or thickness of the compressible material of the compression roller, force (e.g., as measured in Newtons (N)) applied by the compression roller, length (e.g., as measured in meters (m)) of the compression roller, temperature (e.g., as measured in degrees Celsius (° C.)) of the nip in the glossing station, compressibility, compliancy, and/or thickness of the release material and/or the thermal barrier material on the glossing drum, among other such determinants, that influence pressure (e.g., as measured in Newtons per unit area, or Pascals) being applied to the printed image in the nip in the glossing station.

For simplicity, the compression applied by the compression roller to the printed image, as described herein, can be expressed and/or measured in force per unit length of the compression roller (e.g., as measured in N/m). Compressions ranging from 500 to 15,000 N/m can be utilized, in various examples, to produce glossing and/or durability, as described herein.

Optical quality of images overcoated with overcoat material and subjected to print glossing, as described herein, meets the standards of various markets (e.g., the photograph market). For example, when distinctness of image (DOI) measurements of photographs printed on offset media as described herein are compared against silver halide standards, the DOI values are comparable to the DOI values of the silver halide standards. Glossing resulting from application of the overcoat material remains transparent and does not introduce haze, distortion, and/or other irregularities into the image. As such, the quality of glossed LEP photographs is comparable by visual comparison between the glossed LEP and silver halide prints.

Various materials have been evaluated for coating the glossing drum to determine release materials that cleanly release reflowed ink to produce a smooth, high gloss finish on a printed image. The various materials evaluated for suitability as a release material include: Kapton® HN (a 0.025 mm thick polyimide sheet manufactured by DuPont™); Upilex® S (another 0.025 mm thick polyimide sheet manufactured by DuPont™); fluorinated ethylene propylene (FEP) used as a 0.5 mm thick shrink tube; perfluoroalkoxy (PFA) used as a 0.05 mm thick extruded sheet or a 0.2 to 0.25 mm thick coating and/or polyethylene terephthalate (PET or Mylar® manufactured by DuPont™) in various forms and thicknesses; polytetrafluoroethylene (PTFE or Teflon® manufactured by DuPont™) combined with PFA and applied as a 0.020 mm coating; silicone and/or fluorosilicone applied as a 0.20 mm coating among other materials, forms, thicknesses, and/or combinations.

Evaluation of the various materials as a release material shows a correlation between a roughness of a surface of the release material and the resulting gloss of the image. Surface roughness can be quantified by vertical deviations (e.g., peaks and valleys) of a real surface from its idealized flat form. If the deviations are large, the surface is rough. If the deviations are small, the surface is smooth. Determination of roughness can play a role in determining how a surface of an object will interact with its environment. For instance, a large surface roughness value may indicate that the roughness of the surface can promote adhesion to a contiguous object. As used herein, surface roughness is quantified as a mean roughness or roughness average (Ra), which is an arithmetic average of absolute values of the vertical deviations from a center line within an evaluated length of the surface as expressed, for instance, in micrometers.

In general, if the Ra value of a surface is less than 0.1 micrometer, surface gloss measured at an angle of 75 degrees can be high. Accordingly, one of the criteria for the release material on the surface of the glossing drum is to have an Ra value of less than or equal to 0.1 micrometer to facilitate smoothness of a reflowed ink (e.g., the overcoat thereon) pressed and carried thereon and/or reduced to facilitate adhesion of the reflowed ink (e.g., the overcoat thereon) during release thereof. The evaluations show differing results for the various release materials even if the Ra value of each of the materials being compared is less than or equal to 0.1 micrometer. For example, the polyimide sheets may produce higher gloss than some fluoropolymers or silicones, but release of the image from the surface may not be as clean with the polyimide sheets as with the fluoropolymers or the silicones (e.g., as measured at release temperatures of approximately 50° C.).

Glossing can, as described herein, be achieved by reflowing the ink above the glass transition temperature of the ink and releasing at a temperature below the glass transition temperature of the ink. To assist in producing a temperature differential around the circumference of the glossing drum (e.g., a metal drum), a thermal barrier material (e.g., a layer of thermal barrier material) can be affixed to or placed on the outside surface of the glossing drum to form a thermal barrier. Physical parameters of the thermal barrier can be determined from thermal modeling.

For example, the parameters can be selected to satisfy objectives such as the thermal barrier providing enough thermal impedance for a surface temperature of the drum to exceed a core temperature of the drum by up to 50° C. when the drum is heated with an external energy source. For example, IR lamps can have heat fluxes (e.g., power densities) up to approximately 400,000 Watts per square meter. To achieve a temperature difference of 50° C. across a 250 micrometer thick thermal barrier coating, an upper thermal conductivity value for the thermal barrier material can be calculated as:

$$q''=k dT/dx$$

where k is the heat flux and dT/dx is the thermal gradient. As such, heat flux of 400,000 Watts per square meter and a thermal gradient of 50° C./250×10$^{-6}$=200,000° C./m would yield an upper thermal conductivity of approximately 2.0 Watts per meter per degree Kelvin.

The thermal barrier also can have a thermal time constant low enough to cool the barrier surface to below the glass transition temperature of the ink by the time the drum rotates to the release position. The thermal time constant can be calculated as $L^2/\alpha$, where L is a thickness of the thermal barrier and $\alpha$ is a thermal diffusivity of the thermal barrier. For example, for a thermal barrier material such as polyimide, the thermal time constant far a 220 micrometer thick thermal barrier would be approximately 600 msec. Accordingly, a coating with such a material would reach thermal equilibrium in about three times the thermal time constant (e.g., in approximately 1.8 seconds). When the time to reach thermal equilibrium is at most the rotation period of the glossing drum, the surface of the thermal barrier has time to cool down to below the glass transition temperature of the ink by the time the drum rotates to the release position.

An example of a possible configuration for a print glossing apparatus 100 consistent with that shown in FIG. 1 includes an IR lamp 114 that is positioned as close as possible to the glossing station 106 so that a first location 104-1 on the surface of the glossing drum 102 has little time to cool before entering the glossing station 106. As such the position of the IR lamp 114 can in various examples, be adjusted (e.g., by increasing and/or decreasing the distance of the IR lamp horizontally, laterally, and/or vertically relative to the glossing station) to effectively reduce the opportunity for the surface of the glossing drum, and/or the thermal barrier and/or release materials affixed thereto, to cool (e.g., to below a glass transition temperature of the ink) before entering the glossing station 106.

For a fixed energy flux on the drum surface, a temperature profile around the circumference of the glossing drum 102 can, for example, be dependent on a thermal diffusivity and/or thickness of the thermal barrier material 113 and/or the temperature of the glossing drum 102. The temperature of the surface of the thermal barrier material 113 can be plotted around the circumference of the glossing drum 102. For example, for a 250 micrometer thick Kapton® barrier, a glossing drum circumferential velocity of 50 cm/s, an incident IR power density of 230 Watts per square centimeter, a controlled drum core temperature of 45° C., and a glossing station nip width of 20 mm, glossing can occur during a 40 msec window with in temperature dropping from 120 to 110° C. during that interval. By the time the location 104-2 reaches the release station 108 the ink temperature can drop to or below around 60° C.

Polymers such as Kapton® and the other release materials described herein have similar thermal conductivities (e.g., less than 2.0 Watts per meter per degree Kelvin), so that the thermal profiles of the release materials described herein also will be suitable for use as a thermal barrier material. In some examples, oxide barriers (e.g., yttria stabilized zirconia (YSZ), anodized, aluminum ($Al_2O_3$), etc.) are another option, but such oxides may have a thermal conductivity that is roughly an order of magnitude larger than the polymer release materials described herein. Hence, using an oxide barrier material may result in a thicker barrier layer and/or more incident power being used.

A thermal time constant of the thermal barrier (e.g., barrier thickness squared/thermal diffusivity) is small enough so, that the surface of the thermal barrier cools to an acceptable release temperature by the time the second location 104-2 of the ink reaches the release station 108. In some examples, the release station 108 is roughly ⅔ the circumference of the glossing drum 102 relative to the first location 104-1 in the glossing station 106. In some examples, the glossing drum 102 can have a diameter of 300 mm. At a circumferential velocity (e.g., process speed) of 50 cm/s, a full rotation of the drum takes 1.88 seconds. The time constant is less than one-third of this time, or 600 msec, for the location 104-2 on the surface of the glossing drum 102 to cool back down to the core temperature in one revolution. For a drum diameter d, process speed s, and barrier thermal diffusivity $\alpha$, the barrier thickness limit L is calculated as:

$$L<(\pi d\alpha/(3s))^{1/2}$$

For example, the order of thermal diffusivity for Kapton®, $Al_2O_3$, and YSZ is Kapton®<$Al_2O_3$<YSZ, which is reflected in the thickness limit calculated for each material to meet the 600 msec time constant. As such, the calculated Kapton® thickness limit L is approximately 250 micrometers.

As described herein, ink reflows in the glossing station 106 between the compression roller 116 and the glossing drum 102, which can be heated immediately prior to entry into the glossing station 106 by the one or more IR heaters (e.g., lamps). The core temperature of the glossing drum 102 can be controlled to a level that allows clean release of the ink from the glossing drum. This temperature is in general below the glass transition temperature of the polymer of the ink (e.g., the toner thereof). By way of example and not by way of limitation, a portion of the interior of the glossing drum can be cooled to a particular temperature range by controlled passage of a liquid and/or gaseous coolant material therethrough (e.g., by selecting and/or adjusting the temperature placement flow rate, and/or thermal diffusivity, etc. of the coolant material). The image can be removed from the glossing drum 102 by a smaller diameter release roller 118 that creates a high release angle at the location 104-2 between the glossing drum 102 and image at the release station 108. In some examples, the substrate 110 can first pass over a hot roller and/or an IR light source (not shown) that pre-heats the substrate and the pre-printed ink prior to reaching the heating element 114 and/or the compression roller 116 of the glossing station 106.

Accordingly, a print glossing apparatus 100, as described herein, can include a glossing drum 102 having a location 104-1 affixed to a circumferential outer surface thereof that transits from a first position 106 in the apparatus (e.g., a glossing station) having a first temperature range selected to enable reflow of ink applied to a substrate 110 that is placed at the location to a second position 108 in the apparatus (e.g., a release station) having a second temperature range selected for clean release from the location 104-2 of the ink applied to the substrate 110. In various examples, gloss of an image printed on the substrate with the ink can be increased after passage of the image from the first position (e.g., the glossing station) to the second position (e.g., the release station) in a single revolution 112 of the glossing drum 102.

The print glossing apparatus 100 can, in various examples as described herein, include a heating element 114 associated with the first position 108 to raise a temperature of the location 104-1 affixed to the circumferential outer surface of the glossing drum 102 at least to the first temperature range selected to enable the reflow of the ink as the location 104-1 rotates through the first position 106 (e.g., the glossing station). The print glossing apparatus 100 can, in various examples, include a compression roller 116 that compresses, in the first temperature range, the ink applied to the substrate 110 at the location 104-1 affixed to the circumferential outer surface of the glossing drum 102, where the compression roller 116 compresses as the location 104-1 rotates through the first position 106 (e.g., the glossing station) to cause reflow of the ink.

The glossing drum 102 can, in various examples as described herein, include a release material 113 affixed to at least the location 104-1, 104-2 on the circumferential outer surface that remains in contact with the ink of an image on the substrate 110 until the clean release of the ink of the image. The location 104-1, 104-2 affixed to the circumferential outer surface of the glossing drum 102 can, as described herein, have a surface roughness average (Ra) of less than 0.3 micrometers.

Various examples of print glossing systems are described herein. Among such examples, a print glossing system can include a local heating element 114 (e.g., an IR light source) to raise a temperature of a location 104-1 affixed to an outer surface of a glossing drum 102 to at least a glass transition temperature of a toner in a toner-based image, the location 104-1 then placed in direct contact with the toner-based image previously printed on a substrate 110. Such a print glossing system can include a compression roller 116 to apply a compression force on a side of the substrate 110 opposite from the toner-based image with the temperature remaining at at least the glass transition temperature of the toner, where the toner is reflowed to increase gloss by the compression force imparted by the compression roller 116 during rotation 112 of the glossing drum 102. During such rotations 112, the reflowed toner-based image remains in direct contact with the location 104-1 on the outer surface of the glossing drum 102 until a temperature (e.g., of the toner and/or of the location on the outer surface of the glossing drum) falls below the glass transition temperature of the toner in the toner-based image (e.g., within a single revolution of the glossing drum).

In various examples, as described herein, a print glossing system can include a release roller 118 over which the substrate 110 is rolled to cause clean release of the toner-based image after the temperature (e.g., of the toner and/or of the location 104-2 on the outer surface of the glossing drum) falls below the glass transition temperature. In various examples, as described herein, a print glossing system can include a cooling functionality for the glossing drum 102 to cause the temperature (e.g., of the toner and/or of the location 104-2 on the outer surface of the glossing drum) to fall below the glass transition temperature.

In various examples, as described herein, a print glossing system can include a previously printed toner-based overcoat (e.g., transparent ink) on a surface of the previously printed toner-based image opposite from the substrate 110, where the toner-based overcoat is part of the toner-based image and where at least the toner of the toner-based overcoat is reflowed to increase a gloss of the image. In various examples, as described herein, a print glossing system can include the outer surface of the glossing drum 102 being coated with a release material 113 to facilitate clean release of the toner-based image on the substrate 110 after the temperature (e.g., of the toner and/or of the location 104-2 on the outer surface of the glossing drum) falls below the glass transition temperature. In various examples, the release material is one or more material selected from a group that includes a polyimide Kapton®), a PFA, a PTFE, a FEP, a PET, silicone, and/or fluorosilicone, among other examples. In various examples, as described herein, a print glossing system can include the outer surface of the glossing drum being coated with a thermal barrier material 113. In some examples, as described herein, the thermal barrier material can have a thermal conductivity less than 2.0 as measured in Watts per meter per degree Kelvin and/or a thermal time constant that is at most (e.g., less than or equal to) one third of one rotation period of the glossing drum. In some examples, the thermal barrier material can be selected from the same group of materials as the release material.

Some photograph production printer's are operated in series with, for instance, a lamination station. Laminating the as-printed images with approximately 30 micrometers of a high gloss polymer (e.g., polypropylene (PP), biaxially oriented polypropylene (BOPP), PET, among others) may increase the gloss to greater than 95 and may provide increased durability. By comparison, silver halide gloss photographs may have a gloss of approximately 99.

However, printing in combination with a laminator may have a number of drawbacks. Such drawbacks may include the laminator itself being expensive and/or having a large footprint such that it presents problems in compact incorporation with the printer. The laminator may be manufactured and/or serviced by a provider separate from the provider of the printer, thereby possibly creating servicing complications. A lamination film may require that substrates be coated with a polymer film on the back side to prevent water vapor absorption and offset stress inherent in a lamination layer, where such polymer-coated media may be expensive relative to uncoated offset media. Laminated prints may be susceptible to curl, where the degree of curl may change over time due to stress relaxation in the lamination layer and/or water vapor absorption into the print medium. Prints with lamination protection may not provide a cost advantage over silver halide prints.

The glossing system described herein replaces the 30 micrometer lamination layer and the associated lamination station with, for example, 1.0 micrometer of transparent Electroink® overcoat and an in-line glossing apparatus (e.g., in a single printing apparatus). The transparent Electroink® overcoat is based on a polymer (e.g., resin) system that is formulated to provide enhanced durability (e.g., scratch resistance, etc.) to the printed image. No additional equipment is used to apply the overcoat in that the application is an additional impression in the printing process. Gloss at 75 degrees of prints overcoated with transparent Electroink® can be increased from 57 to >95 by passing the prints through a high temperature glossing station while in contact with a smooth release material, as described herein.

FIG. 2 is a flow diagram of an example method 230 for print glossing according to the present disclosure. Unless explicitly stated, the method examples described herein are not constrained to a particular order or sequence. Additionally, some of the described method examples, or elements thereof, can be performed at the same, or substantially the same, point in time.

As shown at 232, the method 230 for print glossing can include placing a surface of a toner-based image directly in contact with a location 104-1 on a circumferential outer surface affixed to a rotating 112 glossing drum 102, where a first temperature of the location 104-1 is at at least a glass transition temperature of a toner in the toner-based image. As shown at 234, the method 230 can include maintaining the toner-based image in direct contact with the location 104-2 affixed to the circumferential outer surface of the rotating 112 glossing drum 102 until a second temperature of the location 104-2 is below the glass transition temperature of the toner.

In various examples as described herein, the method 230 can include locally heating 115 the location 104-1 affixed to the circumferential outer surface of the rotating 112 glossing drum 102 to at least the glass transition temperature and controlling a temperature of at least a portion of an interior of the glossing drum 102 distal from the location 104-1 to be below the glass transition temperature.

In various examples as described herein, the method 230 can include reflowing a toner-based overcoat placed in contact with the location 104-1 (e.g., where the toner-based overcoat is previously printed on a surface of the toner-based image and is part of the toner-based image), wherein a toner of the toner-based overcoat is reflowed to increase at least one of a gloss, as described herein, and a durability (e.g., resistance to scratches, fading, loss of pigment, etc.) of the toner-based image (e.g., relative to an image not processed as described herein).

Accordingly, print glossing as described herein has a number of advantages compared to existing glossing techniques. Such advantages include glossing on a single glossing drum that has a compact footprint and low equipment cost relative to multiunit glossing technologies. The compact glossing drum—and associated heating element compression roller, and/or release roller—can be placed in-line with, for example, a printer (e.g., an LEP digital press) that can operate at commercial press speeds. High gloss can be produced, for example, with a thin (e.g., with a thickness of approximately 1.0 micrometer) overcoat of transparent toner-based material (e.g., a version of Electroink® ink) relative to, for example, a thicker lamination material (e.g., with a thickness of approximately 30 micrometers). Nonetheless, the thin overcoat of transparent toner-based material can produce levels of glossing and durability (e.g., resistance to scratching, curling, etc.) for images printed with the overcoat that are greater than the levels of glossing and durability of uncoated images, and glossing levels that are equivalent to the levels of glossing of lacquered, varnished, or laminated images. Such high gloss and durability can be achieved by print glossing, as described herein, for images printed on offset media that is less costly than special polymer-coated media. As such, images printed and glossed as described herein meet the optical and durability requirements of various markets, including the consumer photograph market.

As used herein, "a", "at least one" or "a number of" an element can refer to one or more such elements. For example, "a number of widgets" can refer to one or more widgets. Further, where appropriate, "for example" and "by way of example" should be understood as abbreviations for "by way of example and no by way of limitation".

Elements shown in the figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed:

1. A print glossing apparatus, comprising:
a glossing drum having a location affixed to a circumferential outer surface thereof that transits from a first position in the apparatus having a first temperature range selected to enable reflow of ink applied to a substrate that is placed at the location to a second position in the apparatus having a second temperature range selected for clean release from the location of the ink applied to the substrate,
wherein the outer surface of the glossing drum is coated with a thermal barrier material having at least one of a thermal conductivity less than 2.0 as measured in Watts per meter per degree Kelvin and a thermal time constant that is at most one third of one rotation period of the glossing drum.

2. The apparatus of claim 1, wherein gloss of an image printed on the substrate with the ink is increased after passage of the image from the first position to the second position in a single revolution of the glossing drum.

3. The apparatus of claim 1, comprising a heating element associated with the first position to raise a temperature of the location affixed to the circumferential outer surface of the glossing drum at least to the first temperature range selected to enable the reflow of the ink as the location rotates through the first position.

4. The apparatus of claim 1, comprising a compression roller that compresses, in the first temperature range, the ink applied to the substrate at the location affixed to the circumferential outer surface of the glossing drum, wherein the compression roller compresses as the location rotates through the first position to cause reflow of the ink.

5. The apparatus of claim 1, wherein the glossing drum comprises a release material affixed to at least the location on the circumferential outer surface that remains in contact with the ink of an image on the substrate until the clean release of the ink of the image.

6. The apparatus of claim 1, wherein the location affixed to the circumferential outer surface of the glossing drum has a surface roughness average of less than 0.3 micrometers.

7. A print glossing system, comprising:
  a local heating element to raise a temperature of a location affixed to an outer surface of a glossing drum to at least a glass transition temperature of a toner in a toner-based image, the location then placed in direct contact with the toner-based image previously printed on a substrate; and
  a compression roller to apply a compression force on a side of the substrate opposite from the toner-based image with the temperature remaining at least the glass transition temperature of the toner, wherein the toner is reflowed to increase gloss by the compression force imparted by the compression roller during rotation of the glossing drum;
  wherein the reflowed toner-based image remains in direct contact with the location on the outer surface of the glossing drum until a temperature falls below the glass transition temperature of the toner in the toner-based image, and
  wherein the outer surface of the glossing drum is coated with a thermal barrier material having a thermal conductivity less than 2.0 as measured in Watts per meter per degree Kelvin.

8. The system of claim 7, comprising a cooling functionality for the glossing drum to cause the temperature to fall below the glass transition temperature.

9. The system of claim 7, comprising a previously printed toner-based overcoat on a surface of the previously printed toner-based image opposite from the substrate, wherein the toner-based overcoat is part of the toner-based image and wherein at least a toner of the toner-based overcoat is reflowed to increase a gloss.

10. The system of claim 7, wherein the outer surface of the glossing drum is coated with a release material to facilitate clean release of the toner-based image on the substrate after the temperature falls below the glass transition temperature.

11. The system of claim 7, wherein the outer surface of the glossing drum is coated with a thermal barrier material having a thermal time constant that is at most one third of one rotation period of the glossing drum.

12. A method for print glossing, comprising:
  placing a surface of a toner-based image directly in contact with a location on a circumferential outer surface affixed to a rotating glossing drum, wherein a first temperature of the location is at least a glass transition temperature of a toner in the toner-based image; and
  maintaining the toner-based image in direct contact with the location affixed to the circumferential outer surface of the rotating glossing drum until a second temperature of the location is below the glass transition temperature of the toner,
  wherein the outer surface of the glossing drum is coated with a thermal barrier material having a thermal time constant that is at most one third of one rotation period of the glossing drum.

13. The method of claim 12, comprising locally heating the location affixed to the circumferential outer surface of the rotating glossing drum to at least the glass transition temperature and controlling a temperature of at least a portion of an interior of the glossing drum distal from the location to be below the glass transition temperature.

14. The method of claim 12, comprising reflowing a toner-based overcoat placed in contact with the location, wherein a toner of the toner-based overcoat is reflowed to increase at least one of a gloss and a durability of the toner-based image.

15. The method of claim 12, wherein the outer surface of the glossing drum is coated with a thermal barrier material having a thermal conductivity less than 2.0 as measured in Watts per meter per degree Kelvin.

16. The method of claim 12, wherein the outer surface of the glossing drum is coated with a release material to facilitate clean release of the toner-based image on the substrate after the temperature falls below the glass transition temperature.

17. The apparatus of claim 1, wherein the outer surface of the glossing drum is coated with a release material to facilitate clean release of the toner-based image on the substrate after the temperature falls below the glass transition temperature.

* * * * *